April 20, 1937.   I. KITROSER   2,078,080
APPARATUS FOR COPYING CINEMATOGRAPHIC FILMS
Filed May 10, 1933
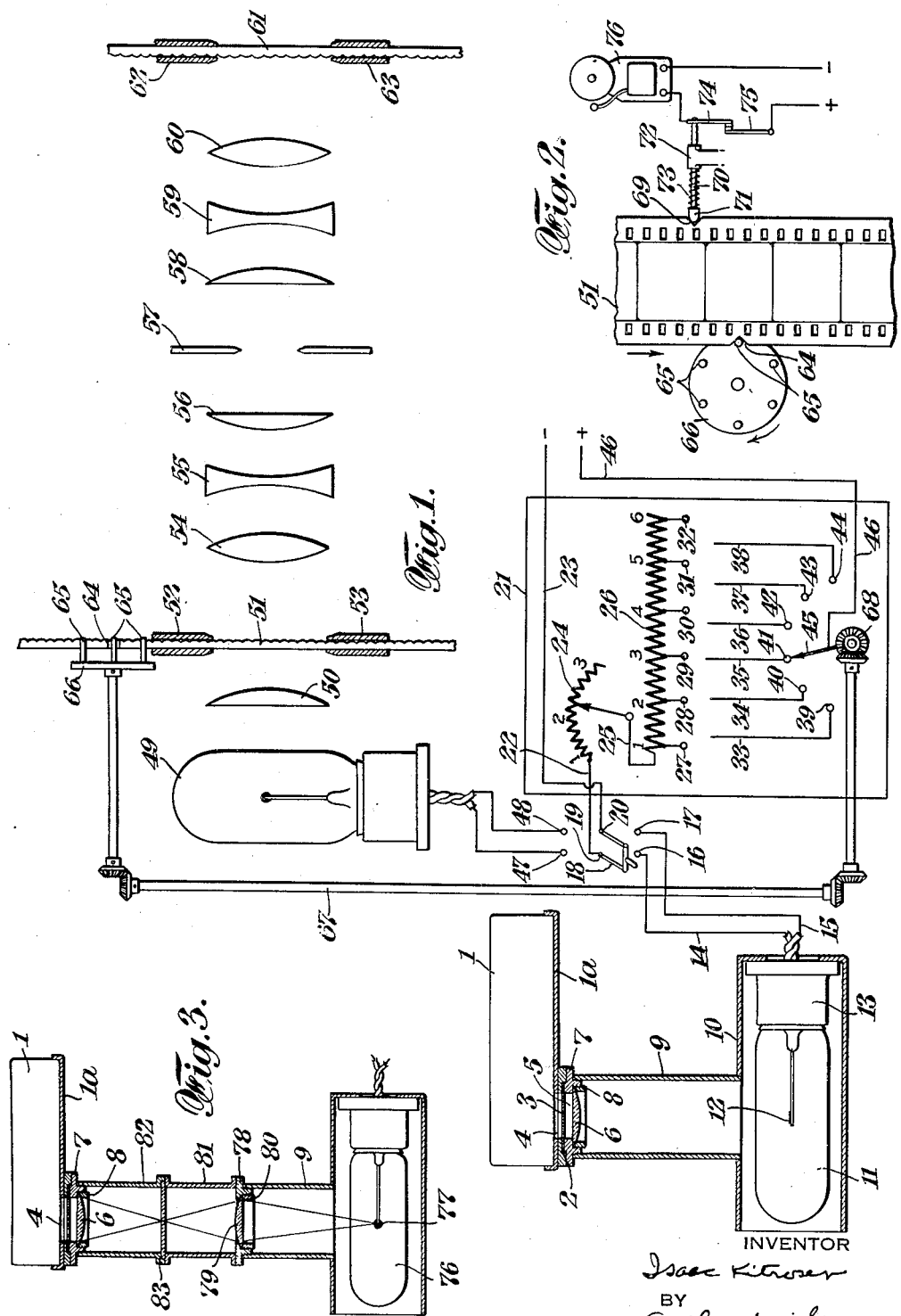
INVENTOR
Isaac Kitroser
BY
Arthur Wright
ATTORNEY Patented Apr. 20, 1937

2,078,080

UNITED STATES PATENT OFFICE 2,078,080

APPARATUS FOR COPYING CINEMATOGRAPHIC FILMS

Isaac Kitroser, New York, N. Y., assignor to Keller-Dorian Colorfilm Corporation, New York, N. Y., a corporation of Delaware Application May 10, 1933, Serial No. 670,253

4 Claims. (Cl. 88—24)

My invention relates to an apparatus for metering in the copying of cinematographic films, and is applicable especially to the metering to be utilized in the lighting and developing of copy films.

Hitherto, there has been a very great wastage of films in the copying of the same, due to the difficulty of establishing and maintaining the most effective lighting and time development of the films. This has been carried out previously entirely by hand and without any definite way of controlling the making of the numerous copies of a single original film. In view of the fact that a single cinematographic picture is comprised of a number of scenes which are pieced together, each of which is taken under different light conditions and with different exposures, it will be readily seen that each of these separate scenes requires, in copying, a different lighting as well as a different time of development. It is because of this fact that in the manufacture of cinematographic film pictures as now conducted, there is a very great wastage of the film in endeavoring to produce the copy film with the best available light and shade values, and this applies, also, in making the many copies as nearly alike as possible. This wastage of film has been a great source of unnecessary expense when the cost of the films which are used in very great lengths is realized. Also, there is a consequent great loss in labor and time involved, the latter being of the utmost importance in the case of some films which must be completed within a time limit interval. My invention is of especial importance in connection with the copying of goffered films, such for example, as are used in the Keller-Dorian process for producing pictures in natural colors, in view of the greater cost of the goffered films as compared with the plain ungoffered films.

The object of my invention is to provide an apparatus by means of which the best light effects may be secured in the copy by definitely establishing and controlling the treatment of the copy and so as to thereby enable any number of copies to be obtained from the original with the same light and with the maximum uniformity. Further objects of my invention will appear from the detailed description of the same hereinafter.

While my invention is capable of being carried out in many different ways, for the purpose of illustration I have shown only one way of carrying out the same in the accompanying drawing, in which Fig. 1 is a diagrammatic representation of an apparatus which is constructed in accordance with my invention;

Fig. 2 is a diagrammatic elevation of a portion thereof; and

Fig. 3 is a vertical section of a modified form of a viewing or testing apparatus designed to permit the comparative testing or observation of the different points of an image on the film.

In the drawing, I have shown a removable Weston exposure meter 1 having the usual light intensity indicating dial and movable pointer which, however, may be any desired apparatus, in which the intensity of the light passing through a film may be observed or determined. This apparatus comprises a meter holder 1a having a slot 2 for receiving a goffered cinematographic film 3, with the gofferings away from the source of light, having a picture taken thereon on the side away from the goffering, in the usual way and which may be either a positive or a negative. Light which passes through the film may enter the apparatus through an opening or gate 4, corresponding in size and shape to an image on the film. The light which thus passes through the film may be observed by the eye after the removal of the Weston meter from the holder 1a, or said light may be measured therein in any desired way and with the aid of any known devices or apparatus. The light enters the film 3 through a collimating lens 6 adapted to produce substantially parallel light before entering the film. This lens 6 is carried within supporting rings 7 and 8 supported within a tube 9 which is fastened against the face of the exposure meter 1 in any desired way. The other end of the tube 9 communicates with the interior of a tube 10 located at right angles thereto, in which there is located an electric lamp 11 which may have a ribbon filament 12 of tungsten, known as a ribbon lamp. Where the film 3 has linear lenticulations or gofferings thereon, this ribbon filament 12 will be arranged parallel to the linear lenticulations. Ordinarily the linear lenticulations of the film 3 will be arranged at right angles to the sides of the film so that the said ribbon filament 12, as shown in Fig. 1, will be arranged longitudinally in the lamp 11 parallel to the transverse lenticulations of the film 3. The lamp 11 is carried in the usual lamp socket 13 having wires 14 and 15 leading, respectively, to poles 16 and 17 of a double throw-switch 18. The switch 18 has fixed terminals 19 and 20 which lead to a variometer 21 by means of wires 22 and 23. The wire 23 is connected to any suitable source of electric current. The wire 22 leads to a manual rheostat 24, another terminal 25 of which is connected to a variable resistance 26 having a series of binding posts or plugs 27, 28, 29, 30, 31 and 32 to any one of which any one of a series of movable wires 33, 34, 35, 36, 37 and 38 may be connected in any desired order. In fact it is to be understood that, if desired, two or more of the movable wires 33, 34, 35, 36, 37 and 38 may be attached to any one of the binding posts or plugs 27, 28, 29, 30, 31 and 32. The wires 33 to 38 are connected at their other ends to a series of fixed contacts 39, 40, 41, 42, 43 and 44, which are arranged in a circular path so as to complete the circuit by a rotary contact arm 45 which is connected by a wire 46 to the source of electric current.

The apparatus thus described will enable a definite lighting to be determined for the film 3 inasmuch as when the desired light intensity is observed through the apparatus 1, the same having been obtained by making a preliminary adjustment of the hand rheostat 24 and then making a final adjustment of the resistance 26 by the preliminary connecting of the wires 33 to 38 with the posts or plugs 27 to 32, respectively, in their normal serial order and then moving the rotary contact 45 so as to obtain the desired lighting through the film 3. When this degree of the lighting has been secured the numbers of the position of the rheostat 24 and of the resistance 26 are noted down and, accordingly, this lighting can always be identified. Where, as would generally be the case in making of copies, a number of copies with different lightings are first made from the original film, the lightings of which being noted down by the numbers from the rheostat 24 and the resistance 26, the best one of the copies thus made can be chosen and further copies can be made in accordance with this best scale of lighting.

For lighting the film during the copying, in accordance with the scale of lighting thus determined from the numbers of the rheostat 24 and the resistance 26, the switch 18 will be thrown into the other position in which the circuit is completed between the terminals 19 and 20 and contacts 47 and 48 which are connected to a lamp 49 and which is arranged so as to equally light the film in any desired type of copying apparatus. This copying apparatus may, however, be arranged as shown in Fig. 1 of my Patent No. 1,884,994, granted October 25, 1932. This comprises a condenser 50 located in the rear of a goffered film 51 which passes through gates 52 and 53 from which the light passes through a symmetrical objective comprised of three lenses 54, 55 and 56 on one side of a diaphragm 57 and lenses 58, 59 and 60 on the other side thereof, from which the light passes to a goffered film 61 fed between gates 62 and 63. As shown in the drawing, for example, the films 51 and 61 may be provided with transverse cylindrical lenticulations. In view of the fact that the different portions of the cinematographic film to be copied have been taken ordinarily with different lightings, especially as such a film is generally made up of a number of different scenes taken in different places and under very different optical conditions, it is necessary to change the light from time to time in making the copy. These different light intensities will have been already determined in accordance with my invention, as above described, for the different parts of the film 51 by noting down the numbers of the rheostat 24 and the resistance 26 used in connection therewith in each individual portion or scene of the film. In order to run through the film 51 for the copying of the entire film and to conduct the lighting accordingly, I have provided means for accomplishing this automatically. For this purpose one edge of the film 51 is provided with a notch 64 whenever the intensity of the light is to be changed. These notches 64 are arranged to contact with a series of pins 65 on a wheel 66 which is connected by any desired gearing 67 to a gear 68 on the contact arm 45. In copying the film 51 the wires 33 to 38 will be connected to any one or more of the posts 27 to 32 and in the proper order so that each section of the film 51 having a different lighting will, by the notch 64 provided at the beginning of the section, bring its correct lighting in the operation through the movement of the rotary contact 45 by the succession of notches, the serial order of the connections of the wires 33 to 38 with the posts 27 to 32 being so arranged as to bring about this correct succession of lightings for the films. It has been assumed thus far that the rheostat 24 has been left in one particular position, as, for example, opposite the No. 2 thereon, for all of the changes in intensities brought about by the resistance 26. However, in case any extraordinary series of intensities is required, as for example where the film has been underexposed or overexposed, the movable contact on the rheostat 24 will be moved to some other position preliminary to any particular sequence of portions of the film 51. This change, of course, can be made at any time in the course of the printing of the film. However, I have provided means for signaling the operator during the printing so that such a change may be made, if desired, to start a new series of the lightings. The new series, of course, can utilize any desired numbers in arranged sequence of the resistances in the resistance 26, after the rheostat 24 has been reset for the new series. For this purpose I have provided the other side of the film 51 with a notch 69 at any desired point or points along the edge of the film so as to sound a bell indicating to the operator that a new series of the lightings is to be started, according to which he will readjust the position of the rheostat 24. For this purpose there is provided a plunger 70 having a pin 71 adapted to enter the notch 69, said plunger being carried in a bracket 72 between which and the plunger 70 there is a spring 73 to normally force the pin 71 toward the notch 69. At the other end the plunger carries a contact 74 which closes a circuit with a contact 75 so as to sound a bell 76 when the pin 71 enters one of the notches 69. Furthermore, the notches 64 and 69 will be effective in completing the copying of the films, by controlling the development of the copy film, that is to say, the notches 64 may also, in addition to the indication of intensity of light exposure, indicate to the operator a change needed in the time of development for the succeeding section of the film and the notches 69 on the other edge of the film will indicate to the operator, during the copying, that a new series of underexposed or overexposed film sections are to follow and, accordingly, he can thereby also, in addition to the indication of intensity of light exposure, radically change the time of development or the character of the developer, etc.

In Fig. 3, I have shown a modification of my invention in which means is provided for focussing an image of the light source on a particular point of the film so that the intensity of the light through different points thereof can be observed comparatively by moving the film to different positions. This is constructed the same as in the previous figures except that a bulb 76 with a point source of light 77 is used and there are inserted between the tube 9 and the ring 7 the following parts: Into the tube 9 there is secured a ring 78 carrying a plano-convex lens 79 held in place by a screw-threaded ring 80. Attached to the ring 78 there is a tube 81 having secured thereto a ring 82 provided with a film slot 83. The tube 82 is adapted to be screw-threaded to the ring 7. The image of the point filament 77 will thus be focussed on the central point of the film in the slot 83, so that the intensity of the light therefrom can thus be determined.

Thus, in accordance with my invention the intensity of the light of any particular film may be preliminarily observed through or with the apparatus 1, the same being capable of being identified when the switch 18 is in the lower position by the positions of the rheostat 24 and the resistance 26. Furthermore, any desired test copies may be made from an original thus tested, using the same intensity of light with the switch 18 thrown in the upward position. When the test copy has been found to have the best lighting desired, this lighting will be noted as identified by the numbers from the rheostat 24 and resistance 26. All the succeeding sections of the cinematographic film may be then made by copying from the original film which has been placed together, comprising sections requiring successive differences in the light intensity during copying, these differences being identified by the numbers from the rheostat 24 and the resistance 26. Previous to making the copy of the complete original containing the series of sections requiring different light intensities, the wires 33 to 38 will be connected in the proper sequence to one or more of the posts 27 to 32, so as to duplicate, during the copying, the series of light intensities required by the succession of sections of the original film requiring different light intensities. Accordingly, when the films are run through the copying apparatus the notches 64 will cause the proper sequence of the light intensities to be brought about through the gearing 67. When any new radically different series of intensities is required, this is indicated by the ringing of the bell 76 from one or more of the notches 69 so that the operator can thereupon immediately readjust the rheostat 24 accordingly. In a similar way, the completion of the copies may be brought about by developing in a desired sequence of changes in the time of development, according to the different light intensities thus indicated by the series of notches 64, any radical difference in the time or change of the developer being indicated by the sounding of a bell arranged like the bell 76 sounded by the notch or notches 69. When using the apparatus of Fig. 3, the intensities of one of the lightest and one of the darkest points of the film can be determined and the average intensity of the whole film determined as the intensity of half the sum of the two intensities thus obtained and this resultant figure used as the intensity to be given to the copies.

While I have described my invention above in detail I wish it to be understood that many changes may be made therein without departing from the spirit of the same.

I claim:

1. In combination, means for ascertaining the required light intensity in copying a cinematographic film and means for applying said light intensity thereto during the copying, comprising an electric lamp to which the copy film is exposed and a resistance controlling the light intensity of the lamp, said means comprising an electric lamp for testing the intensity of the light through the film to be copied, adapted to be connected to said resistance, said resistance comprising a sequence of variable resistance positions, a movable contact cooperating therewith and means to change the sequence in which said contacts are completed.

2. In combination, means for determining the required light intensity in copying a cinematographic film and means for applying said light intensity thereto during the copying, comprising an electric lamp to which the copy film is exposed and a resistance controlling the light intensity of the lamp, said means comprising an electric lamp for testing the intensity of the light through the film to be copied, adapted to be connected to said resistance, said resistance comprising a sequence of variable resistance positions, a movable contact cooperating therewith and means to change the sequence in which said contacts are completed, comprising means for moving the movable contact through the sequence and adapted to be operated by a succession of notches on the film.

3. In combination, means for determining the required light intensity in copying a cinematographic film and means for applying said light intensity thereto during the copying, comprising an electric lamp to which the copy film is exposed and a resistance controlling the light intensity of the lamp, said means comprising an electric lamp for testing the intensity of the light through the film to be copied, adapted to be connected to said resistance, said resistance comprising a sequence of variable resistance positions, a movable contact cooperating therewith and means to change the sequence in which said contacts are completed, comprising means for moving the movable contact through the sequence and adapted to be operated by a succession of notches on the film and means for bringing about a radically different change in the series of intensities, comprising another resistance and another notch on the film indicating the required position of said other resistance.

4. In combination, means for determining the required light intensity in copying a cinematographic film and means for applying said light intensity thereto during the copying, comprising an electric lamp to which the copy film is exposed and a resistance controlling the light intensity of the lamp, said means comprising an electric lamp for testing the intensity of the light through the film to be copied, adapted to be connected to said resistance, said resistance comprising a sequence of variable resistance positions, a movable contact cooperating therewith, means to change the sequence in which said contacts are completed, comprising means for moving the movable contact through the sequence and adapted to be operated by a succession of notches on the film, means for bringing about a radically different change in the series of intensities, comprising another resistance, another notch on the film indicating the required position of said other resistance, and a bell adapted to be sounded by said other series of notches.

ISAAC KITROSER.